United States Patent [19]

Kausch et al.

[11] 4,372,328
[45] Feb. 8, 1983

[54] FIBROUS MATERIAL FOR TOBACCO SMOKE FILTER

[75] Inventors: Erwin Kausch, Jesteburg; Folkhard Tödter, Hamburg, both of Fed. Rep. of Germany

[73] Assignee: B.A.T. Cigaretten-Fabriken GmbH, Hamburg, Fed. Rep. of Germany

[21] Appl. No.: 265,640

[22] Filed: May 20, 1981

[30] Foreign Application Priority Data

May 20, 1980 [DE] Fed. Rep. of Germany ....... 3019163

[51] Int. Cl.³ .............................................. A24D 3/10
[52] U.S. Cl. .................................... 131/332; 131/342; 131/345
[58] Field of Search ........................ 131/332, 342, 345

[56] References Cited

U.S. PATENT DOCUMENTS 3,856,025 12/1974 Sato et al. ........................... 131/332
4,034,768 7/1977 Joyce ................................... 131/332
4,202,356 5/1980 Digenis et al. ...................... 131/332

FOREIGN PATENT DOCUMENTS 441448 1/1936 United Kingdom .
1388580 3/1975 United Kingdom .
1406908 9/1975 United Kingdom .
1423316 2/1976 United Kingdom .
1588253 4/1981 United Kingdom .

Primary Examiner—V. Millin
Attorney, Agent, or Firm—Arnold, White & Durkee

[57] ABSTRACT

This invention relates to a material for tobacco smoke filters. This material comprises cellulose fibers containing amino groups and is obtainable by reacting certain amino compounds with certain reactive cellulose derivatives. Preferably, the filter material of the present invention contains from 70 $\mu$moles to 2 mmoles of amino groups per gram of filter material.

8 Claims, No Drawings

FIBROUS MATERIAL FOR TOBACCO SMOKE FILTER

BACKGROUND OF THE INVENTION

The invention relates to a material for tobacco smoke filters. This material comprises cellulose fibers containing amino groups and is obtainable by the process steps of the present invention as specified in the following description and patent claims.

It is an important advantage of the filter materials of the present invention that they exhibit improved selective retention capacity for gas phase constituents, better than that of the cellulose 2,5-acetates hitherto employed.

Furthermore, no transfer of the active groups into the main smoke occurs, since these active groups are chemically fixed to the cellulose fiber. Finally, the filter material of the invention can also be converted to filter sticks on commercial machinery.

SUMMARY OF THE INVENTION

The filter materials prepared according to the present invention are distinguished by improved selective retention capacity for gas phase constituents of tobacco smoke, for example hydrogen cyanide, nitric oxide and volatile aldehydes.

The reactive cellulose derivatives of the general formulae

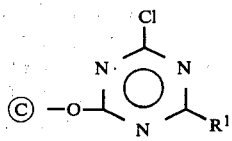     (I)

where $R^1$ is chlorine or amino and Ⓒ —O— is a cellulose radical,

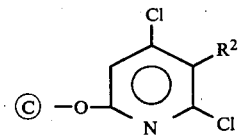     (II)

where $R^2$ is hydrogen or chlorine,

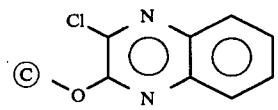     (III)

Ⓒ —O—CH$_2$—CH$_2$—SO$_2$—CH=CH$_2$     (IV)

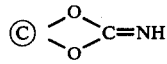     (V)

or

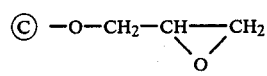     (VI)

are obtained by reacting cellulose with reactants which are for the most part known from the chemistry of reactive dyes. For example, derivative I is obtained by reacting cellulose with dichloroaminotriazines or with trichlorotriazines and derivative II by a similar reaction with trichlorodiazines or tetrachlorodiazines. Derivative III is obtained by reacting cellulose with 2,3-dichloroquinoxalines, derivative IV by reaction with divinyl sulfone or with compounds which on alkaline fixing to the cellulose molecule are converted to such groups, and derivative VI by reaction with epichlorohydrin. Derivative V is formed on reacting cellulose with cyanogen bromide.

The reactive cellulose derivatives thus obtained are subsequently reacted with amino compounds such as ammonia, guanidine, amino acids having a ratio of amino groups to carboxyl groups of not less than 2:1, diamines of the general formula

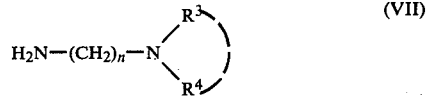     (VII)

where n is 2-6 and $R^3$ and $R^4$ are each, independently of one another, hydrogen or alkyl groups having 1-4 carbon atoms or together form a cyclopentyl, cyclohexyl, pyrrol, imidazole, pyrrolidine, piperidine or morpholine ring, or polyamines of the general formula

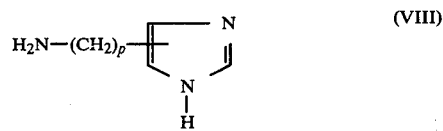     (VIII)

where p is 2-6 or polyethyleneimines of the formula

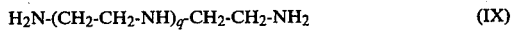     (IX)

where q is 1-6.

DESCRIPTION OF THE PREFERRED EMBODIMENT

The filter materials of the present invention are prepared by converting the optionally partially acetylated cellulose material, by means of the above-mentioned activating reactants, to a reactive cellulose derivative intermediate of the above general formulae I-VI which serves as the starting compound for all the filter materials described below. Preferred activating reactants are cyanogen bromide, 2,4,6-trichlorotriazine (cyanuric chloride) and epichlorohydrin.

The reactive cellulose derivative intermediate thus obtained is reacted with ammonia or with various amines, aminoacids or guanidino derivatives, as illustrated above, to give the desired end products. Specific examples of aminoacids which are especially suitable for the preparation of the filter materials of the invention are arginine, histidine, tryptophane, α,γ-diaminobutyric acid, ornithine, citrulline and canavanine.

The polyamines of the general formula VIII, in particular, include histamine.

The filter materials thus obtained preferably contain the following basic groups: amino, ethylenediamino, hexamethylenediamino, polyethyleneimino, histidino, histamino, arginino and guanidino.

According to an advantageous embodiment of the invention, the starting material is a partially acetylated cellulose which contains an average of 0.5–1.5 acetyl groups per glucose unit. Preferably, the modified filter materials of the present invention contain from 70 μmoles to 2 mmoles of amino groups per gram of filter substance.

The invention is explained in more detail below in relation to preparation examples. The following examples of certain embodiments of the present invention are illustrative only and are not to be construed as limiting in any way.

EXAMPLE 1

10 grams of fibrous cellulose acetate (DS≈0.5) are shaken for 30 minutes with a 15% strength aqueous-alcoholic sodium hydroxide solution. The product is thoroughly squeezed out and is then shaken for a further hour with 18.5 grams of 2,4,6-trichlorotriazine in 200 ml of toluene. The reactive intermediate thus obtained is filtered off, washed with a small amount of ice-cold water and then shaken for 16 hours with 400 ml of 10% strength aqueous ammonia solution. The end product is thoroughly washed with 0.1 M NaHCO$_3$ solution and with water. The washed end product is then dried in vacuo over silica gel.

The active group equivalents are determined titrimetrically. 950 μ-equivalents of amino groups have been bonded per gram of filter material.

EXAMPLE 2

10 grams of fibrous cellulose acetate (DS≈1) are stirred for 15 minutes with 1,000 ml of a freshly prepared aqueous cyanogen bromide solution (25 mg of BrCN/ml) at room temperature, under constant pH conditions (pH 11). The intermediate is filtered off and washed thoroughly with 0.1 M aqueous NaHCO$_3$ solution, and the excess wash solution is pressed out. The intermediate is then stirred for 16 hours with a solution of 14 grams of diaminohexane in 400 ml of 0.1 M aqueous NaHCO$_3$ (T=4° C.). The end product is filtered off, washed with NaHCO$_3$ solution, then water and dried in vacuo over silica gel.

The filter material contains 580 μ-equivalents of amino groups per gram.

EXAMPLE 3

10 grams of fibrous cellulose acetate (DS≈0.5) are treated as described in Example 1, up to the step where the intermediate is isolated. Thereafter, the product obtained is shaken for 16 hours at room temperature with a solution of 10.5 grams of arginine in 400 ml of 0.1 M aqueous NaHCO$_3$. The end product is filtered off, washed thoroughly with NaHCO$_3$ solution and water and dried in vacuo over silica gel. Titrimetric determination shows 1.3 μ-equivalents of active groups per gram of filter material.

SMOKING TEST

The filter materials of the present invention were tested in a smoking test. For this purpose, the filter materials were introduced into a 23 mm long chamber filter whose ends were closed with 7 mm thick cellulose acetate plugs. Similar tests with untreated starting material and with commercial cellulose acetate (DS 2.5) were used for comparison. The sample filters and the comparison filters were attached to 63 mm long commercial cigarette bodies.

All the samples were selected according to weight and draw resistance (115±5 mm water-column for the total cigarette, the draw resistance attributable to the filter being 55±3 mm water-column).

After conditioning, the cigarettes were smoked on an RM 20 CS smoking machine under the conditions of one draw per minute, 35 ml draw volume and 2 seconds draw duration. The following results were obtained:

| Sample | Hydrogen Cyanide (μg) | Volatile Aldehydes (determined as acetaldehyde)(μg) | Nitric Oxide (μg) |
| --- | --- | --- | --- |
| Cellulose acetate (comparison) | 251 | 716 | 302 |
| Untreated starting material | 263 | 767 | 288 |
| Sample 1 | 158 | 643 | 164 |
| Sample 2 | 183 | 640 | 186 |
| Sample 3 | 208 | 578 | 183 |
| Sample 4 | 169 | 553 | 167 |
| Sample 5 | 174 | 550 | 212 |

Sample 1: diaminohexyl-cellulose acetate according to Example No. 2
Sample 2: diaminohexyl-cellulose acetate, prepared analogously to Examples No. 1 and 3
Sample 3: condensation product of cellulose acetate, cyanuric chloride and NH$_3$, according to Example No. 1
Sample 4: arginino-cellulose acetate, according to Example No. 3
Sample 5: diaminoethyl-cellulose acetate, prepared analogously to Example No. 2

It follows from the table that in every case significant reductions in the gas phase constituents were obtained relative to commercial cellulose acetate and untreated comparison materials.

While the above is illustrated of what is now contemplated to be the best mode of carrying out the invention, the present invention is subject to modification without departing from the spirit and scope of the invention. Therefore, the invention is not restricted to the particular method and materials illustrated and described, but covers all modifications which may fall within the scope of the following claims. It is applicants' intention in the following claims to cover such modifications and variations as fall within the true spirit and scope of the invention.

We claim:
1. A material for a tobacco smoke filter, comprising cellulose fibers containing amino groups, which material is prepared by
   (a) introducing reactive groups into the cellulose molecule to give the reactive cellulose derivative structures:

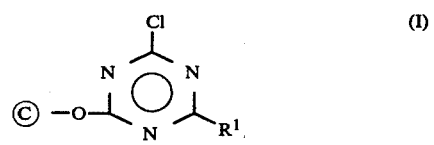

where R$^1$ is chlorine or amino and ©—O— is a cellulose radical,

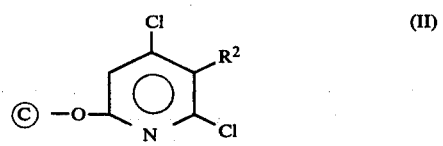

where R$^2$ is hydrogen or chlorine,

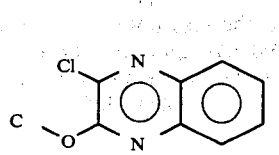 (III)

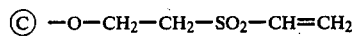 (IV)

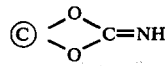 (V)

or

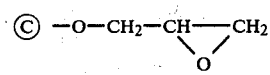 (VI)

and (b) reacting the resulting reactive cellulose groups with ammonia, guanidine, aminoacids having a ratio of amino groups to carboxyl groups of not less than 2:1, diamines of the general formula

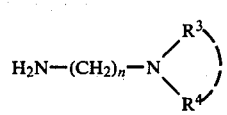 (VII)

where n is 2-6 and $R^3$ and $R^4$ are each, independently of one another, hydrogen or alkyl groups having 1-4 carbon atoms or together form a cyclopentyl, cyclohexyl, pyrrol, imidazole, pyrrolidine, piperidine or morpholine ring, or polyamines of the general formula

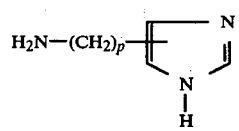 (VIII)

where p is 2-6, or polyethyleneimines of the formula

 (IX)

where q is 1-6.

2. A material according to claim 1, obtained by using as the starting material, a partially acetylated cellulose containing an average of 0.5-1.5 acetyl groups per glucose unit.

3. A material according to claim 1, which contains from 70 μmoles to 2 mmoles of amino groups per gram of filter material.

4. A method of removing at least some of the gas phase components from tobacco smoke, comprising:
   contacting said tobacco smoke containing gas phase components with a filter material comprising cellulose fibers containing amino groups, said filter material prepared by
   (a) introducing reactive groups into the cellulose molecule to give the reactive cellulose derivative structures:

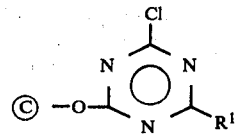 (I)

where $R^1$ is chlorine or amino and C —O— is a cellulose radical,

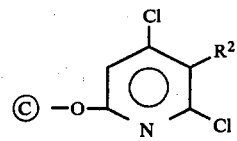 (II)

where $R^2$ is hydrogen or chlorine,

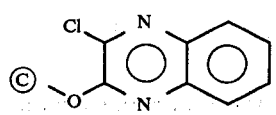 (III)

 (IV)

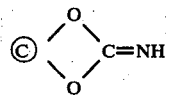 (V)

or

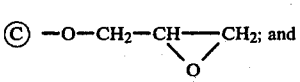 (VI)

(b) reacting the resulting reactive cellulose groups with ammonia, guanidine, aminoacids having a ratio of amino groups to carboxyl groups of not less than 2:1, diamines of the general formula

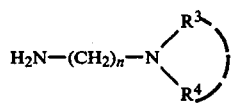 (VII)

where n is 2-6 and $R^3$ and $R^4$ are each, independently of one another, hydrogen or alkyl groups having 1-4 carbon atoms or together form a cyclopentyl, cyclohexyl, pyrrol, imidazole, pyrrolidine, piperidine or morpholine ring, or polyamines of the general formula

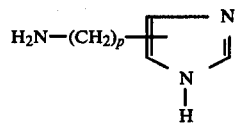 (VIII)

where p is 2-6, or polyethyleneimines of the formula

 (IX)

where q is 1-6.

5. A method of preparing a tobacco smoke filter suitable to remove at least some of the gas phase components from tobacco smoke, comprising:

obtaining a filter material comprising cellulose fibers containing amino groups prepared by
(a) introducing reactive groups into the cellulose molecule to give the reactive cellulose derivative structures:

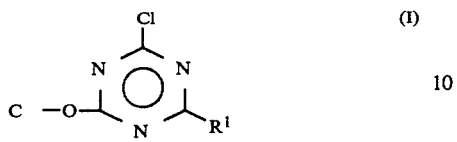
(I)

where $R^1$ is chlorine or amino and ⓒ—O— is a cellulose radical,

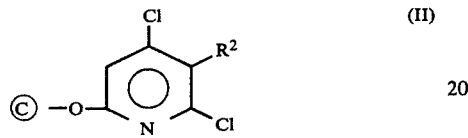
(II)

where $R^2$ is hydrogen or chlorine,

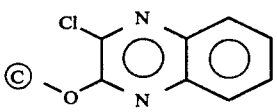
(III)

ⓒ—O—CH$_2$—CH$_2$—SO$_2$—CH=CH$_2$  (IV)

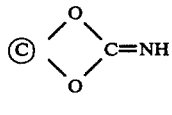
(V)

or

ⓒ—O—CH$_2$—CH—CH$_2$; and  (VI)
$\quad\quad\quad\quad\quad\quad\quad\backslash_O\diagup$ (b) reacting the resulting reactive cellulose groups with ammonia, guanidine, aminoacids having a ratio of amino groups to carboxyl groups of not less than 2:1, diamines of the general formula $$H_2N-(CH_2)_n-N\begin{matrix}R^3\\R^4\end{matrix} \quad\quad (VII)$$

where n is 2–6 and $R^3$ and $R^4$ are each, independently of one another, hydrogen or alkyl groups having 1–4 carbon atoms or together form a cyclopentyl, cyclohexyl, pyrrol, imidazole, pyrrolidine, piperidine or morpholine ring, or polyamines of the general formula $$H_2N-(CH_2)_p-\begin{matrix}N\\N\\|\\H\end{matrix} \quad\quad (VIII)$$

where p is 2–6, or polyethyleneimines of the formula $H_2N$-$(CH_2$-$CH_2$-$NH)_q$-$CH_2$-$CH_2$-$NH_2$   (IX)

where q is 1–6; and
forming a tobacco smoke filter from such filter material.

6. The method of claims 4 or 5 wherein the starting material in preparing said filter material is a partially acetylated cellulose containing an average of 0.5–1.5 acetyl groups per glucose unit.

7. The method of claims 4 or 5 wherein said filter material contains from about 70 micromoles to about 2 millimoles of amino groups per gram of filter material.

8. The method of claim 4 further characterized by having no transfer of the active groups of the filter material into said tobacco smoke.

* * * * *

UNITED STATES PATENT AND TRADEMARK OFFICE
CERTIFICATE OF CORRECTION

PATENT NO. : 4,372,328
DATED : February 8, 1983
INVENTOR(S) : Erwin Kausch et al It is certified that error appears in the above—identified patent and that said Letters Patent is hereby corrected as shown below:

Column 7, lines 6 through 13, please correct formula as follows:

(I)

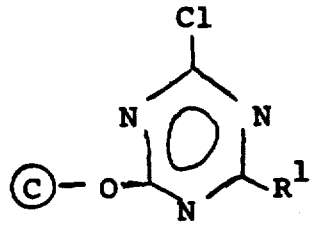

[SEAL]

Attest:

Attesting Officer

Signed and Sealed this

Tenth Day of May 1983

GERALD J. MOSSINGHOFF

Commissioner of Patents and Trademarks